Aug. 14, 1962  R. H. BISHOP  3,049,328
EXTENSIBLE LOAD OR CARGO BRACING DEVICE
Filed Jan. 8, 1960  2 Sheets-Sheet 1
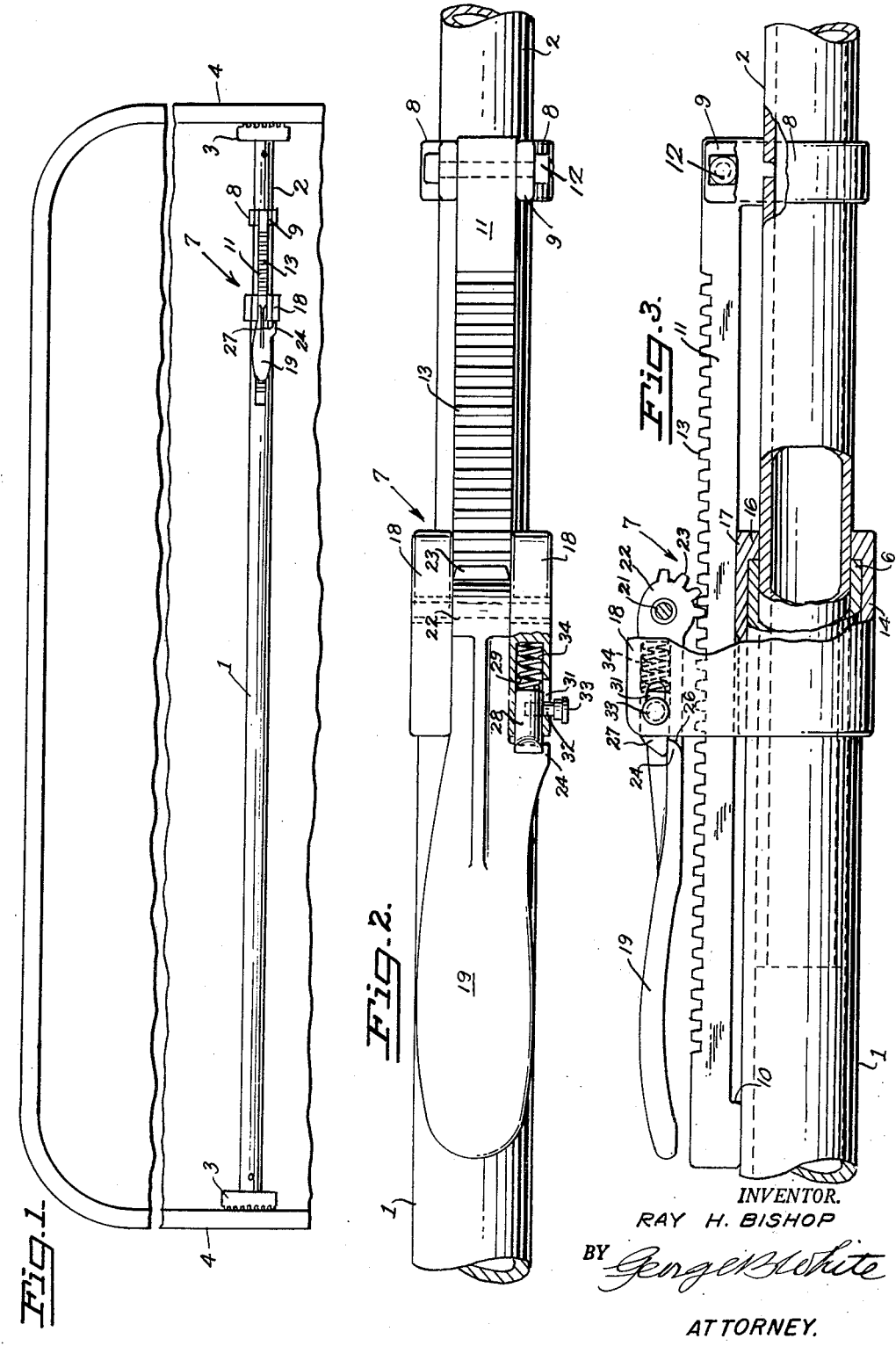
INVENTOR.
RAY H. BISHOP
BY George B. White
ATTORNEY.

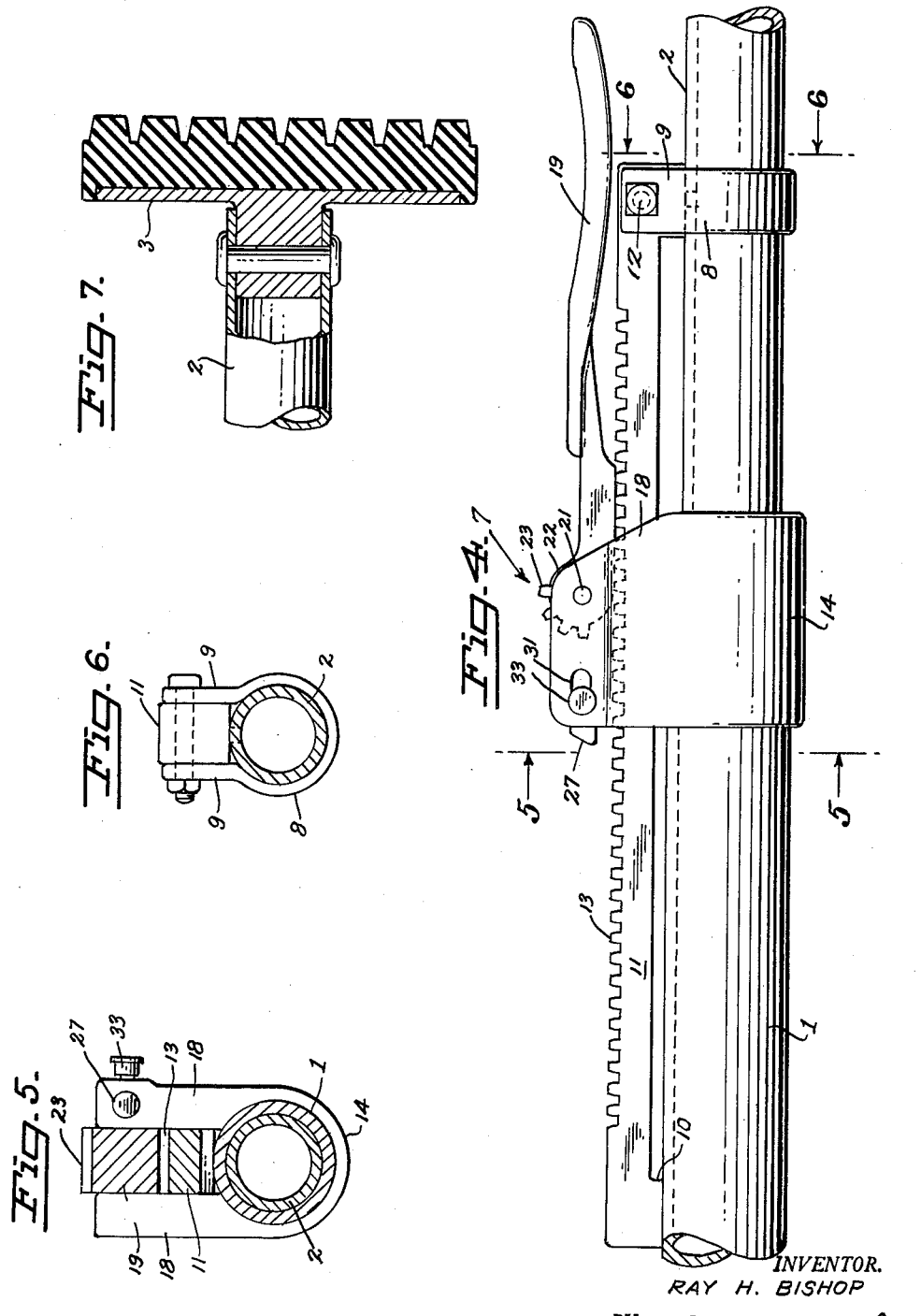

United States Patent Office

3,049,328
Patented Aug. 14, 1962

3,049,328
EXTENSIBLE LOAD OR CARGO BRACING DEVICE
Ray H. Bishop, 1625 16th St., Oakland, Calif.
Filed Jan. 8, 1960, Ser. No. 1,264
1 Claim. (Cl. 248—354)

This invention relates to extensible load or cargo bracing devices and particularly of the type wherein a pair of telescoped bars or tubular members are forced to extend into firm contact with opposite walls of a cargo truck or vehicle.

The primary object of the invention is to provide improvements whereby the extension of the telescope members is greatly facilitated and whereby the applying of the bracing device to the work and its release can be positively and easily accomplished yet the telescoped members can be positively locked in extended bracing position.

I am aware that some changes may be made in the general arrangements and combinations of the several devices and parts, as well as in the details of the construction thereof without departing form the scope of the present invention as set forth in the following specification, and as defined in the following claim; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

FIG. 1 is a partly sectional top plan view of the device in extended position in engagement with opposite walls of a truck.

FIG. 2 is a fragmental top plan view partly in section showing the bracing device in locked position.

FIG. 3 is a partly sectional side view of the device in locked position.

FIG. 4 is a fragmental side view of the device in unlocked position.

FIG. 5 is a cross-sectional view, the section being taken on lines 5—5 of FIG. 4.

FIG. 6 is a cross-sectional view, the section being taken on lines 6—6 of FIG. 4, and FIG. 7 is a sectional view of a pad on an end of one of the telescoping elements.

The bracing device herein broadly includes a tubular outer bar 1 into an end of which telescopes an inner bar 2 which latter may be also tubular. On the free end of each bar is secured a pad 3 adapted to frictionally engage the adjacent walls 4 of a truck body. At the end 6 of the outer bar 1 where the two bars are joined is provided a releasable locking device 7.

The improvement resides in the novel combination of the locking device with telescoping elements for facilitating the final extension or clinching of the brace in position or the quick release of the brace from bracing position.

The locking device includes a collar 8 suitably fixed on the inner bar 2 spaced between the ends of the inner bar 2 so as to leave sufficient length for the telescoping into the outer bar 1. From the top of the collar 8 extend parallel ears 9. A rack 11 has an end thereof secured between the ears 9, for instance, by a suitable bolt 12. The securing bolt 12 between the ears 9 is so spaced from the outer periphery of the inner bar 2 that it spaces the rack 11 and causes it to extend generally longitudinally along the outer bar 1. The free end of the rack 11 has a spacer projection 10 resting on the outer periphery of the outer bar 1. Teeth 13 are on the upper or outer face of rack 11 and are generally flat transversely. The secured end of the rack 11 between the ears 9 is formed into a head 5 with a stud 10 projecting therefrom into a hole 15 in the bar 2 for anchoring the rack 11 and the collar 8.

On the end 6 of the outer bar 1 into which the inner bar 2 telescopes is fixedly secured by press fit or by shrinking a sleeve 14. The end of sleeve 14 is provided with an enlarged flange 16 which extends inwardly and over the end 6 of the outer bar 1. The inner periphery of the flange 16 slidably receives the inner bar 2. The sleeve 14 also has an outwardly projecting spacer projection 17 extended under the rack 11 so as to aid in aligning the rack 11. Parallel spaced bearing flanges 18 extend from the sleeve 14 so as to straddle the rack 11.

A handle 19 is positioned between the bearing flanges 18. A pivot 21 near the tops of the bearing flanges 18, nearer to the end 6 of the outer bar 1, pivots the adjacent end of the handle 19. For this purpose the handle 19 is provided with a hub 22 through which the pivot 21 extends. On the periphery of the hub 22 are a plurality of gear teeth 23 capable of engagement with the teeth 13 of the rack 11. In the present illustration there are four gear teeth 23 on the hub 22 and the same are located on the portion of the hub 22 which extends downwardly and toward the end 6 of the outer bar 1 when the handle 19 is in locking position as shown in FIG. 3. The gear teeth 23 are arranged over an arc of such length that when the handle 19 is turned 180° from the locking position shown in FIG. 3 to the open position shown in FIG. 4, then all the teeth 23 are disengaged from the rack 11 and permit unobstructed sliding of the rack 11 between the bearing flanges 18 for the major adjustment or telescoping of the inner bar 2.

Handle 19 has lock projection 24 thereon so spaced from the hub 22 that when the handle 19 is swung into the clinching position shown in FIG. 3, the projection 24 projects alongside the adjacent bearing flange 18 and slightly beyond the edge of said bearing flange 18. The lower edge of this projection 24 is curved, as shown at 26 in FIG. 3, to facilitate its engagement with the inclined end 27 of a suitable spring loaded catch 28. This catch 28, in this illustration, is slidable in a hole 29 extended from the edge of the bearing flange 18 inwardly above the level of the locking position of the projection 24.

A slot 31 on one side of the hole 29 accommodates the stem 32 of a button 33, which stem 32 is suitably attached to the catch 28 so that the catch 28 can thereby be moved to an out of the way position concealed entirely within the hole 29 by pulling the button 33 along the elongated slot 31 to the right viewing FIGS. 2 and 3. The catch 28 is urged into its locking position by a coil spring 34 positioned in the bottom of the hole 29 and bearing against the inner end of the catch 28 as shown in FIG. 2.

In operation the bracing device is placed between the opposite walls 4 of the truck generally in the position shown in FIG. 1 but initially the handle 19 is in the open position shown in FIG. 4 so as to permit the manual extension of the telescoping inner bar 2 so as to bring the pads 3 into contact with the opposite truck walls 4. Then the handle 19 is turned in a contra-clockwise direction viewing FIG. 4 into the position shown in FIG. 3, during which movement the gear teeth 23 are moved into engagement with the rack teeth 13 so as to exert a spreading force upon the rack 11, namely to urge the rack 11, the collar 8 and the inner bar 2 away from and outwardly with respect to the end 6 of the outer bar 1 thereby to give the final tightening or clinch to the brace bar. This will compress the resilient pads 3 in tightly holding position. As the handle 19 is swung into the position shown in FIG. 3, the curved low edge 26 of the projection 24 engages the inclined end 27 of the catch 28 and pushes the catch 28 into the hole 29 against the action of the coil spring 34. After the projection 24 reaches its closed position, the catch 28 is snapped by the spring 34 into the locking position shown in FIG. 3 and the brace device is held positively and firmly in bracing position. By swinging the handle 19 clockwise from the locking position of FIG. 3, the rack 11 will be moved slightly and the pads are thus released from the truck walls 4.

I claim:

In an extensible load bracing device for engagement with opposite walls of a vehicle, in combination a tubular bracing bar, a second bracing bar slidably telescoped into an end of said tubular bracing bar, a friction pad on the free end of each bracing bar, said bars being in axial extension of one another, a locking bar secured to said second bar and extended along said second bar in spaced relation to said second bar so as to extend axially over and along the exterior of said tubular bracing bar, a locking head on said tubular bracing bar, a handle pivoted on said locking head adjacent said locking bar, connecting means between said handle and said locking bar for converting the pivotal movement of said handle into relative longitudinal movement of said locking bar and of said telescoping bracing bars, and releasable means to lock said handle in the extended position of said telescoping members, parallel flanges extended from said locking head and straddling said locking bar to guide the same, said locking bar having a series of rack teeth thereon, said handle being pivoted between said flanges and outside of said locking bar, a hub on the pivoted end of said handle, a segment of gear teeth on the periphery of said hub engageable with said rack teeth for shifting said locking bar as the said hub is turned with said handle, the said segment of gear teeth being of such extent as to be completely disengaged from the rack bars when the handle is elevated from its locking position to a completely unlocked position so as to permit free relative adjustment of said telescoping bracing bars, said releasable means to lock said handle including a spring catch projecting from one of said flanges, a projection extended from said handle for engagement by said spring catch, and coacting means on said flange and on said spring catch for releasing said spring catch from said handle projection at will.

References Cited in the file of this patent

UNITED STATES PATENTS

| | | |
|---|---|---|
| 836,959 | Bushard | Nov. 27, 1906 |
| 1,091,615 | Angell | Mar. 31, 1914 |
| 1,548,053 | Mead | Aug. 4, 1925 |
| 1,813,426 | Russell | July 7, 1931 |
| 1,881,222 | Nichols | Oct. 4, 1932 |
| 2,532,909 | Hart | Dec. 5, 1950 |

FOREIGN PATENTS

| | | |
|---|---|---|
| 830,337 | Germany | Feb. 4, 1952 |